United States Patent
Kaya et al.

(10) Patent No.: US 12,522,719 B2
(45) Date of Patent: Jan. 13, 2026

(54) TIRE SEALANT

(71) Applicant: ILLINOIS TOOL WORKS INC., Glenview, IL (US)

(72) Inventors: Hava Kaya, Friedrichshafen (DE); Jade Warren, Glenview, IL (US); Martin Spindler, Pfullendorf (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/987,573

(22) Filed: Nov. 15, 2022

(65) Prior Publication Data

US 2024/0158619 A1    May 16, 2024

(51) Int. Cl.
| | |
|---|---|
| C08L 13/02 | (2006.01) |
| B29C 73/16 | (2006.01) |
| C08K 5/053 | (2006.01) |
| C08L 21/02 | (2006.01) |
| C08L 29/04 | (2006.01) |
| C08L 71/02 | (2006.01) |

(52) U.S. Cl.
CPC ............ *C08L 13/02* (2013.01); *B29C 73/163* (2013.01); *C08K 5/053* (2013.01); *C08L 21/02* (2013.01); *C08L 29/04* (2013.01); *C08L 71/02* (2013.01)

(58) Field of Classification Search
CPC .......... B29C 73/163; B29D 2030/0698; B29D 2030/0685; C08L 13/02; C08L 7/02; C08L 9/08; C08L 21/02; C08L 29/04
See application file for complete search history.

(56) References Cited

U.S. PATENT DOCUMENTS

| | | | | |
|---|---|---|---|---|
| 3,352,696 A * | 11/1967 | Wallace | ................ | B29C 73/163 152/503 |
| 4,101,494 A * | 7/1978 | Kent | ................. | B29D 30/0685 252/72 |
| 7,968,319 B2 * | 6/2011 | Liu | ........................ | C12P 7/18 435/158 |
| 9,334,427 B2 * | 5/2016 | Ichikawa | ............. | C08K 5/0008 |
| 9,656,431 B2 * | 5/2017 | Naruse | .................. | B29C 73/163 |
| 2004/0048962 A1 * | 3/2004 | Kojima | ................. | B29C 73/163 524/386 |
| 2006/0142420 A1 * | 6/2006 | Nakazawa | ............ | B29C 73/166 523/166 |
| 2007/0200088 A1 * | 8/2007 | Wehner | ................ | A61Q 19/002 252/73 |
| 2012/0277364 A1 * | 11/2012 | Lolli | ........................ | C08L 7/02 524/388 |

FOREIGN PATENT DOCUMENTS

| | | | |
|---|---|---|---|
| CN | 103131394 A | * | 6/2013 |
| CN | 103497731 A | * | 1/2014 |
| DE | 10 2006 059 286 A1 | | 6/2008 |
| DE | 10 2008 033 514 A1 | | 2/2009 |
| DE | 10 2009 046 938 A1 | | 5/2010 |
| DE | 11 2014 003 671 B4 | | 1/2019 |
| DE | 10 2017 221 098 A1 | | 5/2019 |
| EP | 0 988 960 A2 | | 3/2000 |
| EP | 2157150 A1 | * | 2/2010 ........... B29C 73/163 |
| JP | 4553712 B2 | | 9/2010 |
| JP | 7028042 B2 | | 3/2022 |
| WO | WO 2016/115560 A1 | | 7/2016 |
| WO | WO 2021/158431 A1 | | 8/2021 |

OTHER PUBLICATIONS

Machine translation of CN 103497731 (2014, 4 pages).*
Machine translation of CN-103131394-A (2013, 10 pages).*
Siegmann, K., et al., "Frostschulta: von arktischen Fischen inspiriert," The New Zurich Times, Zurich, Switzerland, Issued: Oct. 31, 2007, (11 pp.), retrieved Apr. 11, 2022: https:/www.nzz.ch/frostschutz_von_arktischen_inspiriert-Id.442189.

* cited by examiner

*Primary Examiner* — Brieann R Johnston
(74) *Attorney, Agent, or Firm* — McAndrews, Held & Malloy, Ltd.

(57) ABSTRACT

An efficient tire sealant that is environmentally friendly or less damaging to the environment, which is characterized by a high stability, good processability, and safe application. The tire sealant includes approximately 5 wt. % to approximately 50 wt. % of a bio-based aliphatic diol; approximately 5 wt. % to approximately 70 wt. % natural rubber latex; and approximately 0.001 wt. % to approximately 10 wt. % of a water-soluble polymer as an additive for adjusting and/or influencing a freezing point of the tire sealant.

21 Claims, No Drawings

TIRE SEALANT

BACKGROUND OF THE INVENTION

Field of the Invention

The present invention relates to an efficient tire sealant that is environmentally friendly or less damaging to the environment, which is characterized by high stability, good processability, and safe application.

Discussion of Related Art

In the case of vehicle pneumatic tires, there is a problem in that they can suffer damage when running over pointed objects, leading to (gradually, if lucky) air pressure loss of the tire. In order to seal such damages as safely as possible for a period of time until the vehicle pneumatic tire can be replaced, tire sealants are known which are injected into the vehicle pneumatic tires as needed, in particular via the air valve of the tire.

On the other hand, self-sealingly configured vehicle pneumatic tires are known, for example from DE 10 2006 059 286 A1. In this case, standard tire designs are retrofitted with a sealant layer. The self-sealing sealant is a self-adhesive, viscous sealing compound, which is applied as a layer from the radially inward projection region of the belt package onto the radially innermost tire layer, the largely air-tight inner layer. The sealant layer is capable of self-sealing punctures of up to 5 mm in diameter. After a puncture through the running strip through to the inner layer, the sealant completely encompasses the infiltrated foreign matter, seals the internal space against the environment, and thus prevents a loss of compressed air from the tire. The driver of the vehicle is not forced to immediately replace the defective tire with a full-fledged spare tire or emergency wheel.

However, the present invention relates to tire sealants that, if necessary, are injected into a tire via the air inlet of the tire. Such tire sealants cause the rubber particles in the tire to aggregate, thereby sealing the hole and allowing driving to continue.

Such a tire sealant is known, for example, from JP 4553712 B2. This prior art teaches a person skilled in the art to increase the glycol content, which is an anti-freezing agent. However, the latex content is low. Since it decreases relatively, the sealing performance is lowered.

Another tire sealant is known from JP 7028042 B2.

SUMMARY OF THE INVENTION

Conventional tire sealants contain an anti-freeze agent, such as propylene glycol, glycerol, or ethylene glycol. The anti-freeze agent is an important ingredient because it determines the viscosity of the tire sealant at low temperatures. A low viscosity at negative temperatures is critical to the tire sealant being able to easily enter the tire and the puncture hole.

Known anti-freeze agents include ethylene glycol, propylene glycol, and glycerol, as well as solutions of potassium acetate with or without glycerol, trimethylglycine, dimethyl sulfoxide, and derivatives and combinations thereof.

Ethylene glycol is often used at negative temperatures due to its low viscosity and excellent freezing behavior.

However, ethylene glycol is toxic. Due to stricter regulations, the use of ethylene glycol in tire sealants is decreasing rapidly. Its upper homolog, propylene glycol, is more environmentally friendly and has replaced ethylene glycol in some tire sealants. However, propylene glycol is more viscous than ethylene glycol so that propylene glycol-based tire sealant has a higher viscosity than ethylene glycol-based tire sealant at negative temperatures. The addition of sufficient water to propylene glycol-based tire sealants lowers its viscosity but increases the freezing temperature of the tire sealant and thus limits its usage temperatures.

While increasing the proportion of propylene glycol relative to water lowers the freezing temperature of the tire sealant, due to the higher viscosity, it reduces the amount of usable rubber, which in turn impairs the sealing performance of the tire sealant.

The use of fibers and ultra-fine bulking agents increases the strength of the coagulation used in order to seal the puncture hole, but increases the viscosity of the tire sealant compared to the higher viscosity caused by the propylene glycol.

In some tire sealants, combinations of ethylene glycol and propylene glycol are used in order to achieve an equilibrium between appropriate viscosity and usage temperature in order to help the tire sealant discharge more easily to the punctured spot.

For a high-performance and environmentally-friendly tire sealant composition, it is desirable that the tire sealant can be easily introduced into the puncture hole, remain free-flowing at temperatures up to −40° C., meet stringent legal requirements, and provide a seal of the puncture hole with high sealing force with a minimum amount of sealant. Thus, there is a need for an improved, high-performance, and environmentally-friendly tire sealant that is easy to inject, can be easily introduced into the puncture hole at temperatures up to −40° C., and has a high sealing strength.

In particular, for environmental reasons, the proportion of anti-freeze agent in tire sealants is to be reduced while ensuring optimum sealing action and an optimum cold storage capability and cold usability. Despite the reduction of the proportion of anti-freeze agent, a low viscosity of the tire sealant is also to be given at low temperatures (in particular up to −30° C. to −40° C.).

In particular, it is desirable to provide an efficient tire sealant that is environmentally friendly or less damaging to the environment, which is characterized by a high stability, good processability, and safe application.

This problem underlying the invention is solved according to the invention by a tire sealant according to independent claim 1, wherein advantageous further developments of the tire sealant according to the invention are specified in the dependent claims.

The tire sealant according to the invention thus comprises in particular between approximately 5 wt. % and approximately 50 wt. % of an in particular and preferably bio-based aliphatic diol, between approximately 5 wt. % and approximately 70 wt. % rubber latex, in particular natural rubber latex, and between approx. 0.001 wt. % and approximately 10 wt. % a water-soluble polymer as an additive for adjusting and/or influencing a freezing point of the tire sealant.

The tire sealant according to the invention is a high-performance, in particular environmentally-friendly tire sealant composition that is usable at temperatures up to −40° C. or below and has a lower viscosity than various conventional tire sealants.

In particular, the tire sealant according to the invention corresponds to various environmental standards, including but not limited to the European REACH regulations (Regulation, Authorization and Restriction of Chemicals), the California Proposition 65 regulations, the Canadian WHMIS (Workplace Hazardous Materials Information System), the U.S. TSCA (Toxic Substance Control Act) and the regulations of the CPSC (Consumer Product Safety Commission), the CLP regulations of Hong Kong, the GADSL regulations (Global Automotive Declarable Substance List), and the Auto OEM Restrict-ed Chemicals List regulations.

The water-soluble polymer present in the tire sealant composition can effectively influence the freezing point of the tire sealant, as a result of which the proportion of anti-freeze agent and in particular the proportion of preferably bio-based aliphatic diol can be significantly reduced compared to conventional tire sealant compositions. The water-soluble polymer thus serves as an additive for adjusting and/or influencing the freezing point of the tire sealant. This is in particular an ice-growth-inhibiting additive mixed with the anti-freeze agent or the aliphatic diol, in particular with the glycol of the tire sealant.

The water-soluble polymer serving as an additive for adjusting and/or influencing the freezing point of the tire sealant is configured, in particular, so as to suppress the freezing point of the tire sealant disproportionally to its concentration, unlike the in particular and preferably bio-based aliphatic diol serving as the anti-freeze agent.

In other words, even a small amount of the water-soluble polymer, in particular approximately 0.001 wt. % to approximately 10 wt. %, significantly more effectively influences the freezing point of the tire sealant or significantly more effectively lowers the freezing point of the tire sealant than would be possible with an anti-freeze agent.

The water-soluble polymer serving as an additive for adjusting and/or influencing the freezing point of the tire sealant is thus considered an "anti-freeze" additive.

Unlike conventionally used anti-freeze agents, such as ethylene glycol, the "anti-freeze" additive suppresses the freezing point of the tire sealant dis-proportionally to its concentration. For this reason, the additive is already effective in concentrations that are 300 to 500 times smaller.

This unusual property of the "anti-freeze" additive is attributed to its ability to irreversibly bind to the surface of the smallest ice crystals. In the sub-cooled water or tire sealant, the crystal would have to continue to grow, but the ice is forced to assume a curved surface, because it must be squeezed out between two adjacent "anti-freeze" polymers. The highly curved surface increases the pressure inside the ice-water droplet, which leads to a decrease in the freezing point (Gibbs-Thomson effect).

In particular, the invention relates to the aforementioned tire sealant, in which the proportion of the aliphatic diol and the proportion of the water-soluble polymer are selected so as to achieve a freezing temperature of −40° C. or less.

DESCRIPTION OF PREFERRED EMBODIMENTS

According to embodiments of the tire sealant according to the invention, the "anti-freeze" additive comprises in particular partially hydrolyzed low-molecular-weight polyvinyl alcohol and/or at least one polyvinyl alcohol oligomer.

Of course, other anti-freeze polymers are possible, as well. In this regard, good results have also been achieved with polyethylene glycol (PEG) or a derivative thereof. The same applies in the transferred sense to polyvinyl pyrrolidone (PVP), polyacrylic acid (PAA), polyacrylamide, polyoxazoline, polyphosphate, polyglycerin in particular with low molecular weight, hydroxyethyl starch, polyamide, in particular poly-L-hydroxyproline and/or hydrophilic polysaccharide, in particular sucrose epichlorohydrin copolymer.

For the in particular and preferably bio-based aliphatic diol serving as the anti-freeze agent, 1,3-propanediol and/or combinations thereof and/or ethylene glycol and/or propylene glycol and/or glycerol is preferably considered.

The in particular and preferably bio-based aliphatic diol can be contained, in particular in an amount less than 50 wt. % and preferably less than 45 wt. % in the tire sealant. As explained above, suitable aliphatic diols comprise propane-1,3-diol and combinations thereof, in particular 1,3-propanediol, 2-methyl-2-propyl-1,3-propanediol, neopentyl glycol and combinations thereof, wherein 1,3-propanediol is in particular suitable. According to embodiments, the preferably bio-based aliphatic diol, such as propane-1,3-diol, is the only anti-freeze agent in the tire sealant.

The tire sealant can be free of or substantially free of methylene glycol, propylene glycol, glycerol, sorbitol, glycol ethers, potassium acetate, trimethylglycine, dimethyl sulfoxide, and other alternative anti-freeze agents. The term "substantially free" means that the anti-freeze agent contains at least approximately 95 parts by weight of the preferably bio-based aliphatic diol and no more than approximately 5 wt. % of another anti-freeze component. According to alternative embodiments, such alternative anti-freeze agents can be used in combination with the preferably bio-based aliphatic diol.

The rubber latex, in particular natural rubber latex, can be contained at approximately 5 wt. % to approximately 70 wt. % in the tire sealant. The rubber latex, in particular natural rubber latex, can be substantially free of coagulation agents and preferably has an average particle size of approximately 400 μm or less. This can be achieved by producing a highly-filtered rubber latex, in that the rubber latex is filtered through a mesh screen. The mesh screen can have openings of approximately 300 to 500 μm, preferably approximately 400 μm. In particular, the natural rubber latex can also be biodegradable.

According to embodiments of the tire sealant according to the invention, the tire sealant comprises between approximately 2 wt. % and approximately 70 wt. % synthetic rubber latex. The synthetic rubber latex preferably comprises polybutadiene rubber, styrene butadiene rubber, acrylonitrile butadiene rubber, ethylene vinyl acetate rubber, chloroprene rubber, vinyl pyridine rubber, butyl rubber, and/or carboxylated versions thereof. As with natural rubber latex, the synthetic rubber latex can contain an amount of water required in order to form the latex.

Preferably, the tire sealant comprises a carboxylated styrene butadiene rubber dispersion, in particular with dry rubber between approximately 20 wt. % and approximately 70 wt. %, and more preferably between approximately 40 wt. % and approximately 50 wt. %. In particular, the tire sealant can have a dry rubber content between approximately 2.5 wt. % and approximately 10 wt. %.

The tire sealant preferably also comprises additional water. In particular, the tire sealant has between approximately 2 wt. % and approximately 30 wt. %, and preferably between approximately 2 wt. % and approximately 25 wt. % additional water. In this context, "additional water" means water that is not already a component of the rubber latex, in particular the rubber latex dispersion.

Additionally, the tire sealant can comprise up to approximately 5% of at least a surfactant. This can be, in particular, a non-ionic, anionic, cationic, and/or amphoteric surfactant. Preferably, polyoxyethylene alkyl ether, polyoxyethylene alkylamine, polyoxyethylene alkylamide, polyoxyethylene resin ester, fatty alcohol ethoxylate, and/or fatty alcohol polyglycol ether is considered as the surfactant.

Alternatively, or additionally, the tire sealant can also comprise between approximately 0.1 wt. % and approximately 5 wt. % of a bulking agent and/or fibers. The bulking agent is preferably selected from the group consisting of calcium carbonate, barium carbonate, silicon dioxide, titanium dioxide, calcium sulfate, barium sulfate, aluminum oxide, and combinations thereof.

Alternatively, or additionally, the tire sealant can contain anti-aging agents, antioxidants, pigments, plasticizers, thixotropic agents, UV absorbents, flame retardants, dispersants, dehydrating agents, antistatics, and/or gelling agents.

According to a preferred implementation of the tire sealant, the tire sealant comprises between approximately 15 wt. % and approximately 50 wt. % ethylene glycol, or preferably between approximately 15 wt. % and approximately 25 wt. % 1,2 or 1,3 propanediol, and between approximately 0.001 wt. % and approximately 10 wt. % in particular partially hydrolyzed low-molecular-weight polyvinyl alcohol as an "anti-freeze" additive.

According to an alternative composition, the tire sealant comprises between approximately 15 wt. % and approximately 50 wt. % propylene glycol and between approximately 0.001 wt. % and approximately 10 wt. % of an in particular partially hydrolyzed low-molecular-weight polyvinyl alcohol as an "anti-freeze" additive. Instead of approximately 15 wt. % to approximately 50 wt. % propylene glycol, the tire sealant can comprise approximately 5 wt. % to approximately 25 wt. % of a 1,3-propanediol and approximately 5 wt. % to approximately 20 wt. 20% glycerine.

In a further alternative embodiment, the tire sealant comprises between approximately 5 wt. % to approximately 25 wt. % 1,3-propanediol and preferably between approximately 2 wt. % and approximately 35 wt. % 1,3-propanediol, and between approximately 0.001 wt. % and approximately 10 wt. % of an in particular partially hydrolyzed low-molecular-weight polyvinyl alcohol as an "anti-freeze" additive.

In yet another implementation of the tire sealant, it comprises between approximately 15 wt. % and approximately 50 wt. % glycerol and between approximately 0.001 wt. % and approximately 10 wt. % of an in particular partially hydrolyzed low-molecular-weight polyvinyl alcohol as an "anti-freeze" additive.

Studies have shown that, in all of the aforementioned design variants, despite the reduced anti-freeze in comparison to conventional tire sealants, reduced viscosity can be achieved even at up to −45° C.

In a particularly preferred design variant of the tire sealant, the tire sealant comprises approximately 25 wt. % to approximately 40 wt. %, and preferably approximately 30 wt. % to approximately 34 wt. %, and even more preferably approximately 31 wt. % to approximately 33 wt. % of an in particular bio-based aliphatic diol, in particular ethylene glycol, propylene glycol, glycerine, and/or 1,3-propanediol.

As an "anti-freeze" additive in this tire sealant composition, approximately 0.001 wt. % to approximately 0.2 wt. %, in particular approximately 0.05 wt. % to approximately 0.1 wt. %, and preferably approximately 0.07 wt. % to approximately 0.08 wt. % polyvinyl alcohol is used.

Additionally, the tire sealant composition comprises approximately 23 wt. % to approximately 30 wt. %, and preferably from approximately 25 wt. % to approximately 29 wt. % additional water, and approximately 25 wt. % to approximately 35 wt. %, and preferably approximately 25 wt. % to approximately 32 wt. % of a rubber, in particular a rubber dispersion.

With the tire sealant compositions mentioned above, a freezing point of below −30° C. and even below −40° can be achieved (depending on the proportion of the "anti-freeze" additive).

The invention claimed is:

1. A tire sealant, comprising:
   5 wt. % to 50 wt. % of a bio-based aliphatic alcohol;
   5 wt. % to 70 wt. % rubber latex;
   a water-soluble polymer, wherein the water-soluble polymer functions as an additive for adjusting and/or influencing a freezing point of the tire sealant, and wherein the tire sealant comprises less than 0.1 wt. % of the water-soluble polymer; and
   0.001 wt. % to 5 wt. % of at least one surfactant, wherein the at least one surfactant is selected from polyoxyethylene alkyl ether, polyoxyethylene alkylamine, polyoxyethylene alkylamide, polyoxyethylene resin ester, fatty alcohol ethoxylate, and fatty alcohol polyglycol ether, and combinations thereof,
   wherein the tire sealant does not comprise an antioxidant.

2. The tire sealant according to claim 1, wherein the water-soluble polymer serving as an additive for adjusting and/or influencing the freezing point of the tire sealant is configured so as to suppress the freezing point of the tire sealant disproportionately to its concentration, unlike the bio-based aliphatic alcohol serving as the anti-freeze agent.

3. The tire sealant according to claim 1, wherein the water-soluble polymer serving as an additive for adjusting and/or influencing the freezing point of the tire sealant is selected from partially hydrolyzed polyvinyl alcohol, at least one polyvinyl alcohol oligomer, and combinations thereof.

4. The tire sealant according to claim 1, wherein the water-soluble polymer serving as an additive for adjusting and/or influencing the freezing point of the tire sealant is selected from a polyethylene glycol (PEG), a derivative thereof, polyvinylpyrrolidone (PVP), polyacrylic acid (PAA), a polyacrylamide, a polyoxazoline, a polyphosphate, polyglycerin, hydroxyethyl starch, a polyamide, a hydrophilic polysaccharide, a sucrose epichlorohydrin copolymer, and combinations thereof.

5. The tire sealant according to claim 1, wherein the bio-based aliphatic alcohol is selected from 1,3-propanediol, ethylene glycol, propylene glycol, glycerol, and combinations thereof.

6. The tire sealant according to claim 1, wherein the tire sealant further comprises:
   2 wt. % to 70 wt. % of synthetic rubber latex, wherein the synthetic rubber latex is selected from polybutadiene rubber, styrene butadiene rubber, acrylonitrile butadiene rubber, ethylene vinyl acetate rubber, chloroprene rubber, vinyl pyridine rubber, butyl rubber, carboxylated versions thereof, and combinations thereof.

7. The tire sealant according to claim 1, wherein the tire sealant comprises a carboxylated styrene butadiene rubber dispersion.

8. The tire sealant according to claim 7, wherein the tire sealant has a dry rubber content between 2.5 wt. % and 10 wt. %.

9. The tire sealant of claim 1, wherein the tire sealant further comprises:
   2 wt. % to 30 wt. % additional water.

10. The tire sealant according to claim 1, wherein the tire sealant further comprises:
    up to 15 wt. % of a tackifying agent,
    wherein the tackifying agent is selected from at least one of terpene resin, a phenolic resin, a terpene phenolic resin, a colophonium resin, a xylene resin, polyvinyl ester, polyvinyl alcohol, polyvinylpyrrolidone, and combinations thereof.

11. The tire sealant according to claim 10, wherein the tackifying agent comprises a resin-based resin emulsion, having a dry content between 40 wt. % and 70 wt. %.

12. The tire sealant according to claim 1, wherein the tire sealant further comprises:
    0.1 wt. % to 5 wt. % of a bulking agent and/or fibers, wherein the bulking agent is selected from the group consisting of calcium carbonate, barium carbonate, silicon dioxide, titanium dioxide, calcium sulfate, barium sulfate, aluminum oxide, and combinations thereof; and/or
    wherein the tire sealant further comprises at least one of the following:
        anti-aging agents, pigments, plasticizers, thixotropic agents, UV absorbents, flame retardants, dispersants, dehydrating agents, antistatics, and gelling agents.

13. The tire sealant according to claim 1, wherein the tire sealant comprises:
    15 wt. % to 50 wt. % ethylene glycol and less than 0.1 wt. % of a partially hydrolyzed polyvinyl alcohol as an additive for adjusting and/or influencing the freezing point of the tire sealant; or
    15 wt. % to 50 wt. % propylene glycol and less than 0.1 wt. % partially hydrolyzed polyvinyl alcohol as an additive for adjusting and/or influencing the freezing point of the tire sealant; or
    5 wt. % to 25 wt. % 1,3-propanediol and less than 0.1 wt. % partially hydrolyzed polyvinyl alcohol as an additive for adjusting and/or influencing the freezing point of the tire sealant; or
    15 wt. % to 50 wt. % glycerol and less than 0.1 wt. % partially hydrolyzed polyvinyl alcohol as an additive for adjusting and/or influencing the freezing point of the tire sealant.

14. The tire sealant according to claim 1, wherein the tire sealant comprises:
    25 wt. % to 40 wt. % of a bio-based aliphatic alcohol;
    less than 0.1 wt. % polyvinyl alcohol;
    23 wt. % to 30 wt. % additional water; and
    25% to 35% of a rubber.

15. A tire sealant, comprising:
    5 wt. % to 50 wt. % of a bio-based aliphatic alcohol;
    5 wt. % to 70 wt. % rubber latex;
    0.001 wt. % to 0.08 wt. % of a water-soluble polymer as an additive for adjusting and/or influencing a freezing point of the tire sealant; and
    0.1 wt. % to 5 wt. % of a bulking agent, wherein the bulking agent is selected from barium carbonate, titanium dioxide, calcium sulfate, aluminum oxide, and combinations thereof,
    wherein the tire sealant does not comprise an antioxidant.

16. The tire sealant according to claim 15, wherein the water-soluble polymer serving as an additive for adjusting and/or influencing the freezing point of the tire sealant is selected from partially hydrolyzed polyvinyl alcohol, at least one polyvinyl alcohol oligomer, and combinations thereof.

17. The tire sealant according to claim 15, wherein the bio-based aliphatic alcohol is selected from 1,3-propanediol, ethylene glycol, propylene glycol, glycerol, and combinations thereof.

18. The tire sealant according to claim 15, wherein the tire sealant comprises:
    15 wt. % to 50 wt. % ethylene glycol and 0.001 wt. % to 0.08 wt. % of a partially hydrolyzed polyvinyl alcohol as an additive for adjusting and/or influencing the freezing point of the tire sealant; or
    15 wt. % to 50 wt. % propylene glycol and 0.001 wt. % to 0.08 wt. % partially hydrolyzed polyvinyl alcohol as an additive for adjusting and/or influencing the freezing point of the tire sealant; or
    5 wt. % to 25 wt. % 1,3-propanediol and 0.07 wt. % to 0.08 wt. % partially hydrolyzed polyvinyl alcohol as an additive for adjusting and/or influencing the freezing point of the tire sealant; or
    15 wt. % to 50 wt. % glycerol and 0.001 wt. % to 0.08 wt. % partially hydrolyzed alcohol as an additive for adjusting and/or influencing the freezing point of the tire sealant.

19. A tire sealant comprising:
    5 wt. % to 50 wt. % of a bio-based aliphatic alcohol;
    5 wt. % to 70 wt. % rubber latex;
    2 wt. % to 25 wt. % water, wherein the 2 wt. % to 25 wt. % of water does not include any water that is a component of the rubber latex; and
    0.001 wt. % to 0.05 wt. % of a water-soluble polymer as an additive for adjusting and/or influencing a freezing point of the tire sealant;
    wherein the water-soluble polymer serving as an additive for adjusting and/or influencing the freezing point of the tire sealant is selected from a polyethylene glycol (PEG), a derivative thereof, polyvinylpyrrolidone (PVP), polyacrylic acid (PAA), a polyacrylamide, a polyoxazoline, a polyphosphate, polyglycerin, hydroxyethyl starch, a polyamide, a hydrophilic polysaccharide, a sucrose epichlorohydrin copolymer, and combinations thereof.

20. The tire sealant according to claim 19, wherein the tire sealant further comprises:
    0.001 wt. % to 5 wt. % of at least one surfactant, wherein the at least one surfactant is selected from polyoxyethylene alkyl ether, polyoxyethylene alkylamine, polyoxyethylene alkylamide, polyoxyethylene resin ester, fatty alcohol ethoxylate, and fatty alcohol polyglycol ether, and combinations thereof.

21. The tire sealant according to claim 15, wherein the tire sealant comprises 0.001 wt. % to 0.05 wt. % of the water-soluble polymer.

* * * * *